RICHARD B. ROBBINS, OF ADRIAN, MICHIGAN.

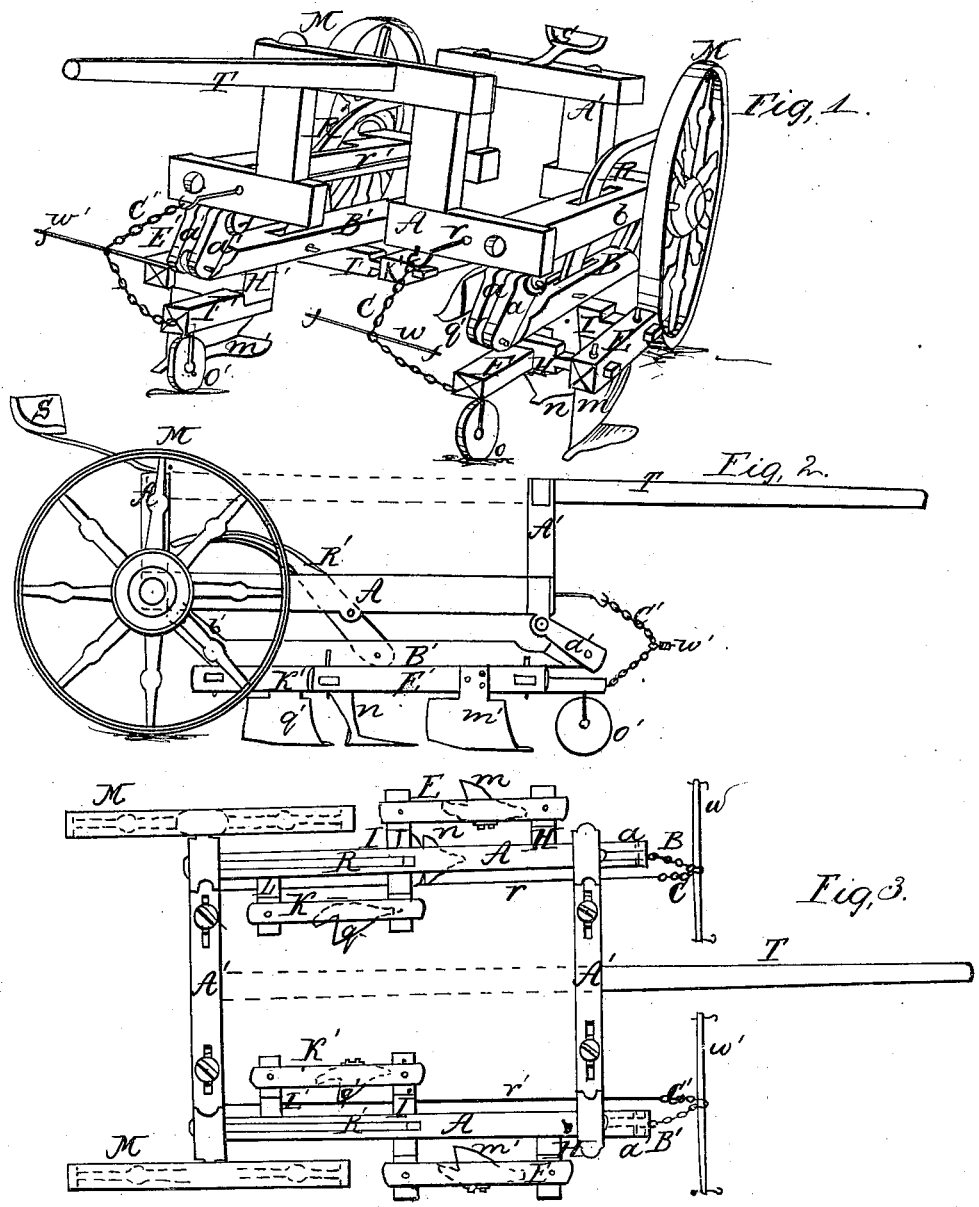

Letters Patent No. 87,296, dated February 23, 1869.

IMPROVEMENT IN CORN-CULTIVATOR.

The Schedule referred to in these Letters Patent and making part of the same.

*To all whom it may concern:*

Be it known that I, RICHARD B. ROBBINS, of Adrian, in the county of Lenawee, and State of Michigan, have invented a new and useful Improvement in a Corn-Cultivator; and I do hereby declare that the following is a full, clear, and exact description of the construction and operation of the same, which will enable others skilled in the art to make and use my invention, reference being had to the annexed drawings, and to the letters of reference marked thereon, making a part of this specification, like letters referring to like parts.

The nature of my invention consists in the novel construction of a corn-cultivator, the several parts so arranged on wheels that the teeth of the cultivator may be thrown into or out of the ground by means of levers provided for that purpose.

To enable others skilled in the art to make and use my invention, I will now proceed to describe its construction and operation.

In the drawings—

Figure 1 is a perspective view of a corn-cultivator embodying my invention.

Figure 2 is a side view of the same.

Figure 3 represents its appearance when viewed from a point directly over it.

This invention is designed more particularly as a double cultivator for cultivating corn, and is intended to finish two rows at once crossing the field, one row, passing under the elevated portion of the frame A A', being entirely finished, and simultaneously, the two spaces between this row and the row on either side being each one-half cultivated, completes what is equivalent to two whole rows.

The teeth $m$, $n$, $q$, $q'$, and $m'$, of the cultivator, are arranged upon two similar frames, each one of which consists of the five parts H E I K L, and is formed somewhat after the shape of the letter S, and suspended under the frame A A' by the horizontal pieces B and B' and the links $a$ and $b$ and $a'$ and $b'$, and swing forward and backward, and hence upward and downward, by the hand or foot-levers R and R', as represented by the drawings.

The cultivator-teeth are made adjustable, so as to throw the earth to or from the hill, at the pleasure of the operator, and to further cultivate the width of the space between the rows (if need be) by the middle tooth $n$.

The change to be made for cultivating to and cultivating from the hill is quickly accomplished, by shifting the teeth from one frame to the other. Thus, to throw the earth against the hill, the teeth are set as shown in the drawings by the letters $m$, $n$, and $q$; and to throw the earth from the hill, the teeth are reversed, that is, changed from side to side, and this is effected by exchanging places with their beams.

Should it ever be desired to convert this cultivator into a gang-plow, it can be readily done by detaching the teeth, and substituting plows in their stead, and contracting the width of the frame by adjustable screws.

The machine is to be drawn by two horses, and the whiffle-trees are attached to a chain, C, one end of which is secured to the reach F, and the other end to a rod, $r$, of iron, which runs backward to the axle-tree, or to any other part of the machine which is sufficiently strong to hold it. The whiffle-trees are hooked into any link of the chain C which will insure the proper depth for cultivating the ground. This mode of applying the draught takes the strain off of the levers R and R', which are used chiefly to elevate the teeth out of the ground.

The frames H E I K L and H' E' I' K' L' may be raised by shortening, and lowered by lengthening the links $a$ and $b$ and $a'$ and $b'$ to any desirable height, to cultivate any desired depth.

When the cultivator-teeth are in the ground, the draught of the horses is principally upon that portion of the chain C or C' below the whiffle-trees, and remains there until the operator wishes to throw the teeth out of the ground, which he does by means of the levers R and R'. As he bears down on them, the teeth are raised, and at the same time thrown forward, out of the ground, during which operation the chains C and C' slacken, and the draught changes from the chain below the whiffle-trees to that above, and remains there until the levers are raised, and the teeth again enter the ground.

Having thus described my invention,

What I claim as new, and desire to secure by Letters Patent, is—

1. The frames H E I K L and H' E' I' K' L', in combination with their respective links $a$ and $b$ and $a'$ and $b'$, for the purposes of raising and lowering the teeth, substantially as set forth and described.

2. The combination of the rods $r$ and $r'$ with the frames H E I K L and H' E' I' K' L', or their equivalents, substantially as set forth and described.

3. The levers R and R', in combination with their respective frames H E I K L and H' E' I' K' L', substantially as described.

4. The chains C C', or their equivalents, for the uses and purposes herein described.

R. B. ROBBINS.

Witnesses:
L. R. WALLACE,
NELLIE PARKER.